United States Patent

Szepessy et al.

[11] Patent Number: 6,117,063
[45] Date of Patent: Sep. 12, 2000

[54] APPARATUS AND METHOD TO COOL A BEARING IN A CENTRIFUGAL SEPARATOR

[75] Inventors: Stefan Szepessy, Stockholm; Jouko Juhani Pitkämäki, Tumba, both of Sweden

[73] Assignee: Alfa Laval AB, Tumba, Sweden

[21] Appl. No.: 09/096,913

[22] Filed: Jun. 12, 1998

[30] Foreign Application Priority Data

Jun. 16, 1997 [SE] Sweden .................................. 9702289

[51] Int. Cl.$^7$ ..................................................... B04B 15/02
[52] U.S. Cl. .............................. 494/14; 494/15; 494/83; 384/467; 384/476
[58] Field of Search .............................. 494/14, 15, 83; 384/467, 476

[56] References Cited

U.S. PATENT DOCUMENTS

| 4,091,988 | 5/1978 | Bodine et al. | 494/15 |
| 4,946,433 | 8/1990 | Gorodissky et al. | 494/15 |
| 5,915,843 | 6/1999 | Mattera | 384/316 |

FOREIGN PATENT DOCUMENTS

| 1328778 | 4/1963 | France . |
| 7-279975 | 10/1995 | Japan . |
| 264105 | 1/1927 | United Kingdom . |
| 985804 | 3/1965 | United Kingdom . |
| 2 121 118 | 12/1983 | United Kingdom . |

*Primary Examiner*—Charles E. Cooley
*Assistant Examiner*—Michael A. Fleming
*Attorney, Agent, or Firm*—Fish & Richardson P.C.

[57] ABSTRACT

The invention refers to a device and a method for cooling a bearing of a centrifugal separator. Through a portion (11, 21) adjacent to the bearing extends at least one channel (15, 23), which is arranged to receive a flow of a cooling medium and comprises at least two successive channel portions (23) and at least one connecting portion (24) provided between successive channel portions. The connecting portion (24) is arranged to provide such a mixing of the cooling medium in the flow through the channel that the flow has an essentially uniform velocity profile immediately after the connecting portion.

5 Claims, 3 Drawing Sheets

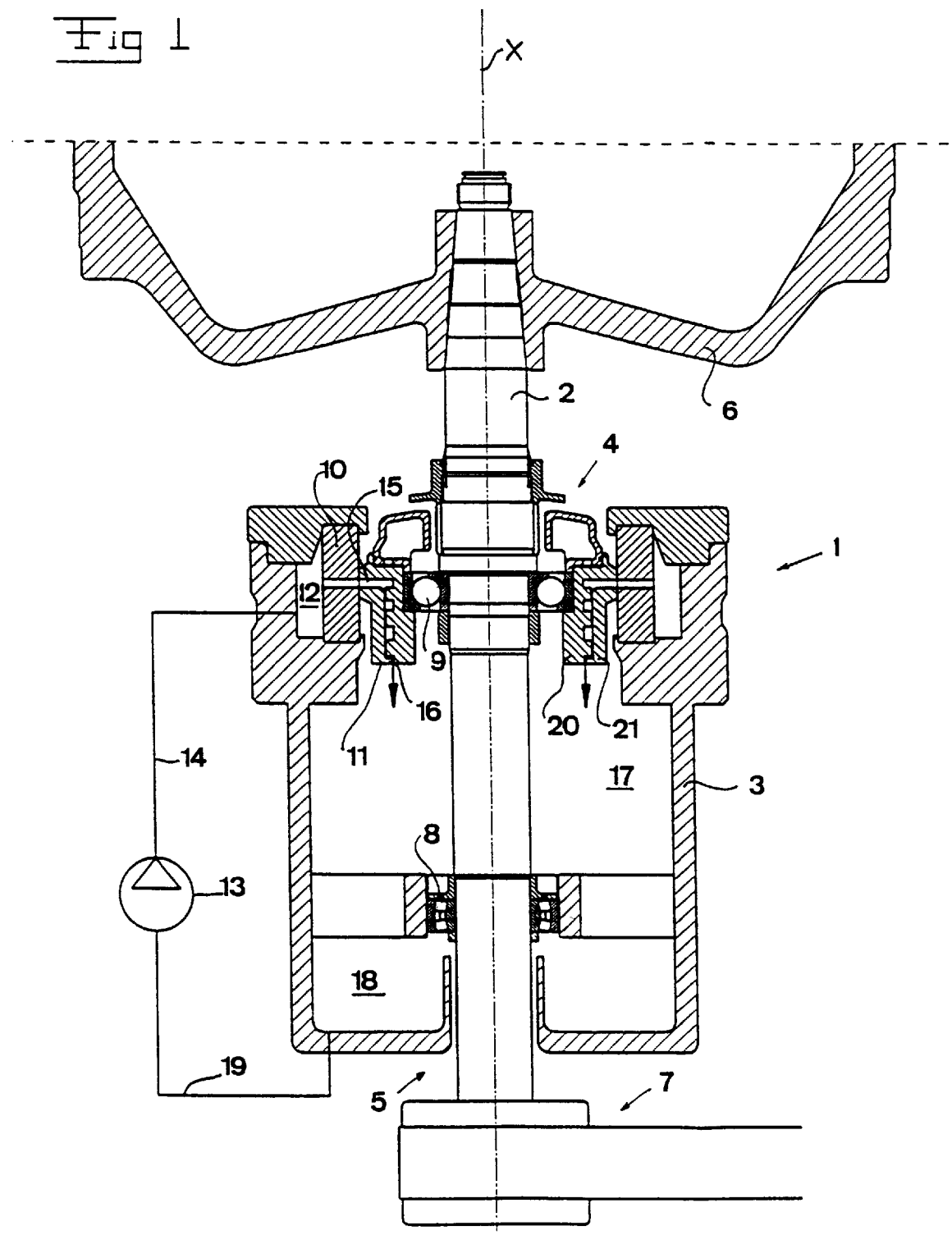

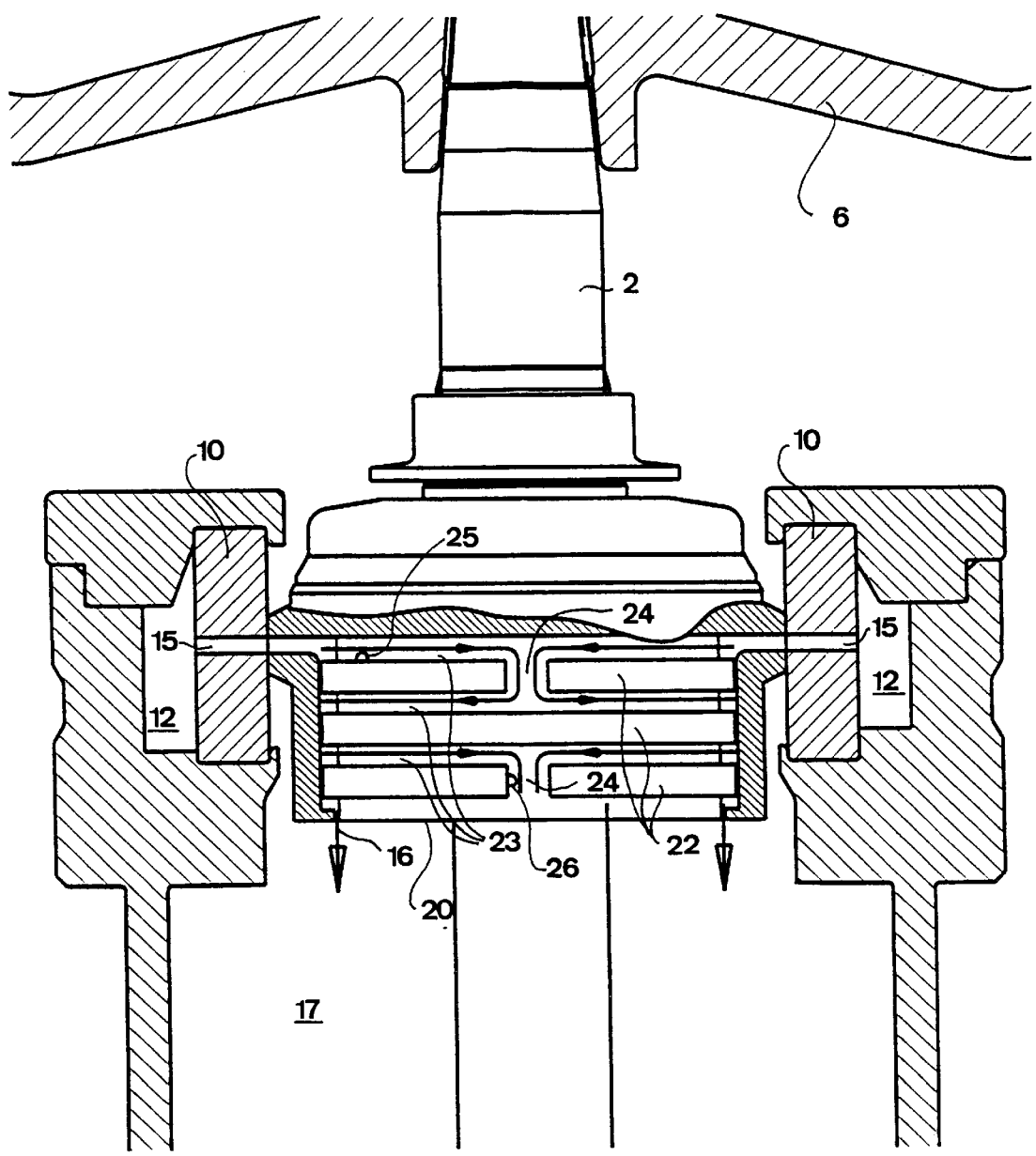

APPARATUS AND METHOD TO COOL A BEARING IN A CENTRIFUGAL SEPARATOR

THE BACKGROUND OF THE INVENTION AND PRIOR ART

The present invention refers to a device for cooling a bearing of a centrifugal separator, comprising a portion adjacent to the bearing and at least one channel, which extends through this portion, is arranged to receive a flow of a cooling medium and comprises at least two successive channel portions and at least one connecting portion provided between successive channel portions. Moreover, the invention refers to a method of cooling a bearing of a centrifugal separator, wherein a cooling medium is conveyed in a flow through at least one channel, which is provided in a portion adjacent to the bearing and comprises at least two channel portions successively provided.

The cooling of bearings of centrifugal separators has traditionally involved an internally recirculating air stream absorbing the heat in the actual bearing and giving off the heat to other parts of the centrifugal separator, for instance the inner side of the wall of the support of the centrifugal separator. Such a system requires the provision of a fan forcing the air stream through the bearings. However, such a fan requires space and therefore it may be difficult to provide the fan in the proximity of the bearing. Furthermore, the fan proper generates additional heat which has to be cooled away. In addition, the fan causes a significant complexity with respect to the sealing against other spaces of the centrifugal separator and against the environment, which in many cases may give rise to problems.

One way of solving at least a part of these problems is to provide a separate cooling of the bearing, i.e. to cool the bearing by means of a fluid carried through a cooling channel separated from the bearing proper. In such a manner, the cooling fluid need not be mixed with other fluids in the centrifugal separator. However, by such a cooling system it is difficult to obtain a sufficient cooling capacity since the space available for the provision of separate cooling channels in the proximity of the bearing is limited.

GB-A-2 121 118 discloses a device for cooling a slide bearing, comprising a portion adjacent to the slide bearing and a channel extending through this portion and being arranged to receive a flow of a cooling medium. The channel comprises successive helical channel portions and a connecting portion provided between successive channel portions. The connecting portion is designed in such a manner that the flow is redirected about 180°. In this document nothing is said about the appearance of the flow or the influence of the redirection of the flow. Instead, the connecting portions rather appear to be designed in such a manner that their influence on the flow is as small as possible.

GB-A-985 804 discloses a device for cooling a roller bearing, comprising a portion which encloses the roller bearing and which comprises a plurality of parallel radial flanges extending in the peripheral direction. The channel comprises an axial inlet passage, an axial outlet passage and a plurality of parallel channel portions defined by said flanges. From the inlet passage the flow is redirected 90° into the different channel portions. It is also mentioned that it is possible to provide the flanges in an overlapping configuration in such a manner that the channel portions will extend at least partly in series with each other. However, also this document is silent about the appearance of the flow or the influence of the redirection of the flow.

SUMMARY OF THE INVENTION

The object of the present invention is to remedy the problems mentioned above and to provide a device and a method enabling an efficient cooling of a bearing, in particular in a centrifugal separator.

This object is obtained by the device initially defined and characterized in that said connecting portion is arranged to provide such a mixing of the cooling medium in said flow through the channel that the flow has an essentially uniform velocity profile immediately after the connecting portion.

By such a connecting portion, the heat transfer between the cooling medium and the channel portions, i.e. the bearing, may be enhanced in such a manner that the cooling channel may be designed to have a relatively small flow area, which means that an efficient cooling may be obtained within a minor space. The present invention is based on the following relations. At a relatively slow laminar flow in a channel, a temperature boundary layer is developed along the wall surfaces of the channel from no thickness at the inlet of the channel to a finite thickness after a certain inlet distance. This means that the heat transfer in the beginning of the inlet distance, where the temperature boundary layer is thinnest, is high and that the heat transfer is lower when the temperature boundary layer is fully developed. When the boundary layer is at its thinnest the velocity profile of the flow will thus be relatively uniform, i.e. the velocity of the flow is equal over the whole cross-section of the channel. When the temperature boundary layer is fully developed, the velocity profile of the flow will be uneven or in particular parabola shaped, i.e. the flow velocity is lower adjacent to the channel walls than in the center of the channel.

In accordance with the present invention, the channel is thus designed in such a manner that the boundary layer of the flow through the channel is essentially thinner immediately after said connecting portion than immediately before said connecting portion. In the channel portion, a continuous development of a boundary layer will take place after said connecting portion. By the mixing suggested, the heat transfer may be significantly improved in spite of the laminar flow and the development of a temperature boundary layer connected therewith. The heat transfer may be optimized by giving said channel portion a length which is determined by the development of a boundary layer of the flow of a certain thickness.

If, in accordance with the present invention, the flow is thus vigorously mixed after each channel portion in a connecting portion prior to the entering of the following channel portion, the temperature boundary layer developed will be broken down and the essentially uniform velocity profile will be re-established at the entrance of the following channel portion. If such a mixing is performed, preferably at repeated occasions, the total heat transfer may be enhanced significantly in comparison with a flow essentially not disturbed during its way through the different channel portions.

According to an embodiment of the invention, such a connecting portion may comprise a redirection of said flow. Such a sharp redirection, for instance essentially 180°, may be sufficient to mix the flow in such a manner that the boundary layer is broken down. The connecting portion may also comprise a reduction of the cross-sectional area of the channel. Also by such an area reduction or throttling, which enables a powerful increase of the flow velocity, a sufficient mixing of the flow may be obtained. It is also possible to obtain such a mixing by means of at least one irregularity at the channel wall, said irregularity comprising at least one of a projection and a recess, for instance in the shape of protuberances, gills, cavities and the like. Furthermore, the connecting portion may comprise a passage which is common to two channels provided in such a manner that the flows through these channels meet in the passage. It is also to be noted that such a mixing may be obtained by a combination of at least some of the measures mentioned above.

According to a further embodiment of the invention, such portion has a center axis which is arranged to essentially coincide with the rotational axis of the centrifuge rotor of said centrifugal separator, said channel portion extending in the peripheral direction with respect to the center axis. Thereby, said portion may comprise a number of essentially radial flanges provided in such a manner that an intermediate space is formed between adjacent flanges, such an intermediate space forming at least one of said channel portions. Such intermediate spaces will form surrounding grooves at the outer surface of said portion, the width and depth of the grooves defining the dimensions of the channel portion. Furthermore, each flange may comprise at least one passage connecting adjacent intermediate spaces to each other, such a passage forming one of said connecting portions. The path of the flow through such a passage results in a powerful redirection of the flow in such a manner that the desired mixing is obtained. Furthermore, said portion may comprise an inlet for two channels, from which two channel portions extend in opposite, essentially tangential directions, said passage forming a connecting portion for two such channels. Thus, two flows will meet at the connecting portion, which contributes to an efficient mixing of the flows.

According to a further embodiment of the invention, said channel portion has an essentially constant cross-sectional area along its essentially complete length.

The object is also obtained by the method initially mentioned and characterized in that the cooling medium in said flow between successive channel portions is subjected to such a mixing that the flow immediately after the mixing receives an essentially uniform velocity profile.

Preferred embodiments of the method are defined in the subclaims.

BRIEF DESCRIPTION OF THE DRAWINGS

The present invention is now to be explained more closely by means of different embodiments and with reference to the drawings attached.

FIG. 1 discloses schematically an axial section through a shaft-supporting unit in a centrifugal separator having a cooling device according to an embodiment of the invention.

FIG. 2 discloses more closely the cooling device in FIG. 1 in a partly sectional view.

FIG. 3 discloses schematically the development of a boundary layer in a channel of the cooling device in FIG. 1.

DETAILED DESCRIPTION OF DIFFERENT EMBODIMENTS

Figure 11:
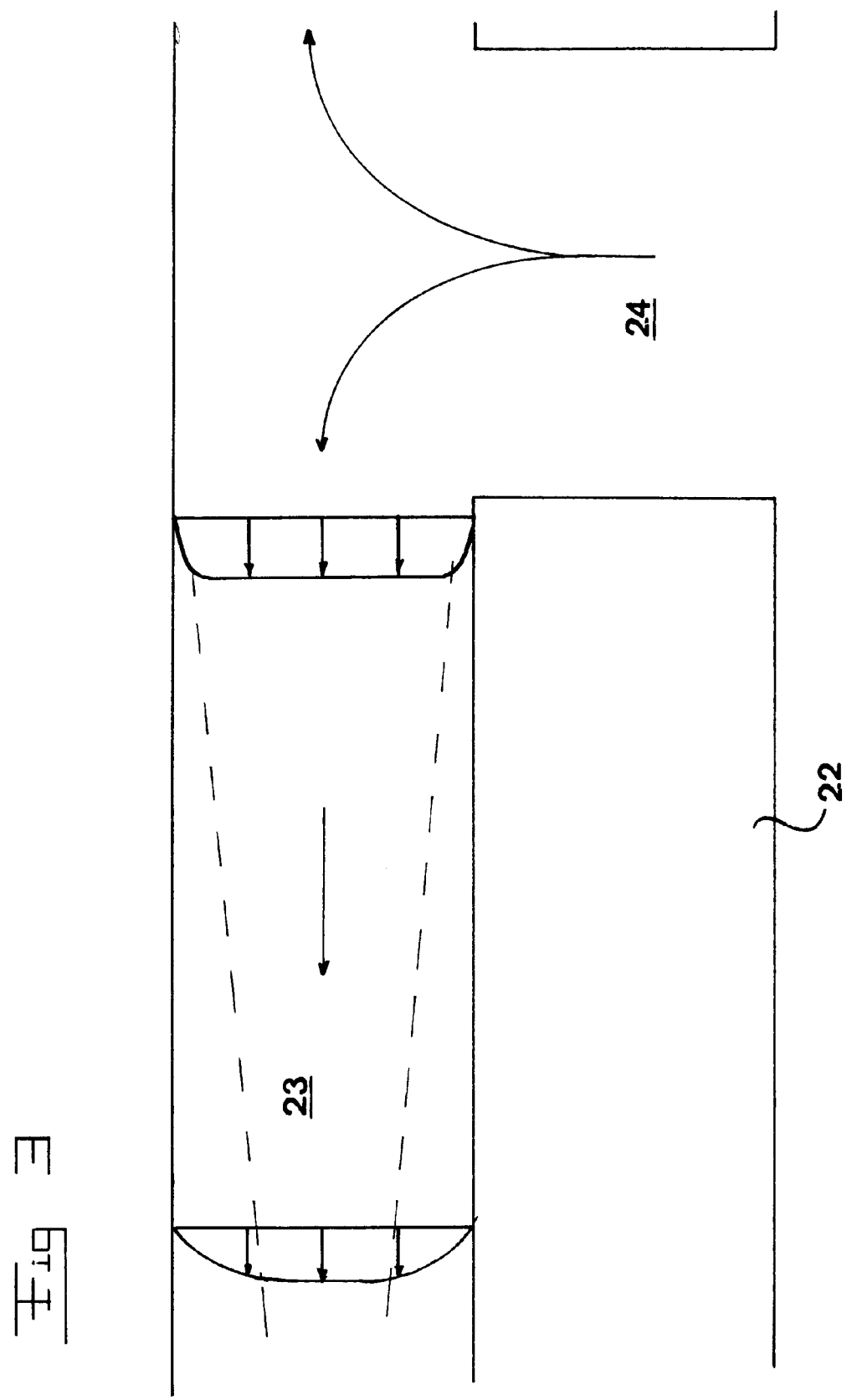

The shaft support unit 1 disclosed in FIG. 1 carries a shaft 2 of the centrifugal separator, which is arranged to rotate about a rotational axis x. The shaft support unit 1 has an outer casing 3 enclosing the shaft 2. In the axial end portions of the outer casing 3, two apertures 4 and 5, respectively, are provided, through which the shaft 2 extends. A centrifugal rotor 6 is fixedly attached to one axial end of the shaft 2 and a belt drive device 7 is provided on the other axial end for driving the shaft 2 and the centrifuge rotor 6. The shaft 2 is journalled in a lower bearing 8, which is essentially directly connected to the outer casing 3, and in an upper bearing 9 which is connected to the outer casing 3 via an annular elastic element 10 and a bearing housing 11. The elastic element 10 forms together with the outer casing 3 a chamber 12 extending around the shaft 2 radially outside the elastic element 10.

In accordance with the present invention, the shaft support unit 1 comprises a cooling device for cooling the upper bearing 9. It is to be noted that it is also possible to cool the lower bearing 8 by such a device. The cooling device comprises a cooling circuit for recirculating a cooling medium, which in the example disclosed is oil. Also cooling media other than oil ought to be possible to utilize, for instance water or any other liquid. The cooling circuit comprises a pump 13 pumping the oil via a first conduit 14 to the chamber 12. From the chamber 12, the oil is carried via an inlet chamber 15 extending through the elastic element 10 and into the bearing housing 11. In the bearing housing 11, cooling channels are provided which are to be described more closely below. Furthermore, the bearing housing 11 comprises an outlet 16 from which the oil flows freely down through an inner space 17, which is formed by the outer casing 3, to a collecting vessel 18 in the lower part of the inner space 17. From the collecting vessel 18, the oil is carried via a second conduit 19 back to the pump 13.

The bearing housing 11 comprises a portion 20 which has a centre axis arranged to coincide with the rotational axis x and adjoining directly the upper bearing 9, and in particular a radially outer bearing ring of the upper bearing 9. The portion 20 is housed in a circular cylindrical recess of a sleeve 21. As appears from FIG. 2, the portion 20 has flanges 22 projecting radially with respect to the centre axis and extending around the outer surface of the portion 20. In such a manner, grooves 23 are formed between the flanges 22, which grooves also extend around the portion 20 in the peripheral direction thereof. Each flange 22 comprises two diametrically opposing interruptions 24 forming passages between two adjacent grooves 23. The interruptions 24 of two adjacent flanges 22 are displaced 90° in relation to each other. When the portion 20 is provided in the sleeve 21, the grooves 23 will together with the wall of the circular cylindrical recess of the sleeve 21 form closed channel portions, the passages 24 forming connecting portions between the channel portions. As appears from FIG. 2, two inlet channels 15 extend radially inwardly through the elastic element 10 and the sleeve 21 into a first groove 23 of the portion 20. From the inlet channel 15, the flow of oil will be redirected and flow in two opposite tangential directions in the upper groove 23. After a quarter of a round, the flow reaches a first passage 24 from two directions where the flows meet and are redirected 180° prior to continuing in a second groove 23. After a further quarter of a round, the flows will once again be redirected and continue in a third groove. After a quarter of a round in the third groove, the flows exit through the outlet 16 and into the inner space 17. It is of course possible to provide the cooling device according to the invention with more than three grooves. In certain applications, two grooves may also be sufficient.

By means of the pump 13, the oil flow will thus flow radially inwardly from two opposite directions into the upper groove 23 and be distributed to two channel portions 23 from each inlet channel 15. It is to be noted that by the device according to the invention merely a relatively small flow is possible, which means that the pump 13 may have small dimensions in comparison with the fan employed according to previously known technique. The flow may be in the order of 2–4 l/min. A flow of that order may flow essentially laminar through the channel portion 23 and a temperature boundary layer will be developed continuously adjacent to the wall of each channel portion 23 as appears from FIG. 3. At the connecting portion 24 the flow is redirected and the temperature boundary layer is broken down. In the next channel portion 23, the flow having a uniform velocity profile is re-established, whereafter a new temperature boundary layer once again develops continuously.

The present invention is not limited to the embodiment disclosed herein but may be varied and modified within the scope of the following claims.

For instance, the channel portions 23 may have another extension than the one disclosed and extend parallel to the center axis or in a helically shaped path.

The connecting portions 24 may also be designed in many different manners and for instance merely consist of an irregularity at the channel wall, a throttling or merely a redirecting in for instance an S-shaped path. Such an irregularity may for instance be formed by the projections 25, 26 which are disclosed in FIG. 2. The projection 25 is provided along the channel portion 23 and forms merely a throttling whereas the projection 26 is provided in the connecting portion 24 and thus forms a throttling in connection with a redirection of the flow. Also other embodiments may be considered for providing a disturbance of the flow in such a manner that the oil therein is mixed.

What is claimed is:

1. A method of cooling a bearing of a centrifugal separator, wherein a cooling medium is conveyed in a flow through at least one channel, said flow having a boundary layer, said channel being provided in a portion adjacent to the bearing and comprising at least two channel portions successively provided, wherein the cooling medium in said flow between successive channel portions is subjected to mixing to improve the efficiency of heat transfer from the bearing such that the flow immediately after the mixing receives an essentially uniform velocity profile and further wherein said channel is designed in such a manner that the boundary layer of the flow through the channel is essentially thinner immediately after said mixing than immediately before said mixing.

2. The method according to claim 1, wherein that the cooling medium is introduced through an inlet of said channel portion in such a manner that it has an essentially uniform velocity profile in an area essentially immediately after the inlet, and further wherein said mixing is performed when the flow has developed a boundary layer of a determined thickness.

3. The method according to claim 1, wherein that said mixing is provided by redirecting the flow.

4. The method according to claim 1, wherein that said mixing is provided by throttling the flow.

5. The method according to claim 1, wherein that said mixing is provided by letting the flow from two channels meet in a common passage.

* * * * *

UNITED STATES PATENT AND TRADEMARK OFFICE
CERTIFICATE OF CORRECTION

PATENT NO. : 6,117,063
DATED : September 12, 2000
INVENTOR(S) : Stefan Szepessy and Jouko Pitkamaki It is certified that error appears in the above-identified patent and that said Letters Patent is hereby corrected as shown below:

Column 6,
Line 19, delete "that".
Line 26, delete "that".
Line 28, delete "that".
Line 30, delete "that".

Signed and Sealed this

Eleventh Day of September, 2001

Attest:

*Attesting Officer*

NICHOLAS P. GODICI
*Acting Director of the United States Patent and Trademark Office*